United States Patent Office.

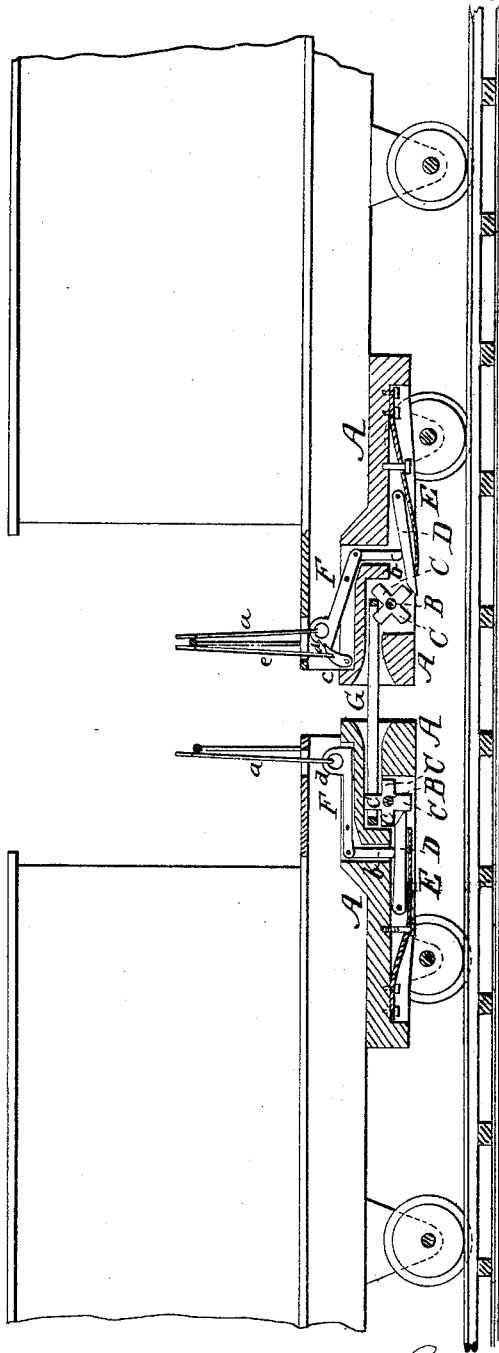

EDWIN R. WHITNEY, OF PLATTSBURG, NEW YORK, ASSIGNOR TO HIMSELF AND JOSEPH FRAZER, OF SAME PLACE.

*Letters Patent No. 76,368, dated April 7, 1868.*

IMPROVED CAR-COUPLING.

*The Schedule referred to in these Letters Patent and making part of the same.*

TO ALL WHOM IT MAY CONCERN:

Be it known that I, EDWIN R. WHITNEY, of Plattsburg, in the county of Clinton, and State of New York, have invented a new and improved Car-Coupling; and I do hereby declare that the following is a full, clear, and exact description thereof, which will enable others skilled in the art to make and use the same, reference being had to the accompanying drawing, forming a part of this specification.

The drawing represents a longitudinal sectional elevation of my improved car-coupling.

This invention relates to a new car-coupling, which is so arranged that it can be wholly operated from the platform or top of the cars. The object of the invention is to avoid the accidents frequently occurring in coupling cars, and to facilitate the operation of uncoupling.

The invention consists in the use of a revolving four-armed cross, which is mounted on an arbor, having its bearings in the coupling-box, and around one arm of which the coupling-link is laid. The cross is, by a suitable pawl or dog, prevented from turning while the link is inserted, and only by withdrawing the pawl will the cross be released. The pawl is withdrawn by means of a bar which reaches up through the platform of the car. For coupling, the link is pushed against the upright arm of the cross, and will thereby turn the same back, so as to become locked. The device is thus made self-coupling, and can be uncoupled from the platform or roof of a car, by raising the aforesaid bar.

A represents the coupling-box of a railroad-car, made of ordinary or suitable material. B is a horizontal arbor, having its bearings in the sides of the box A. C is a four-armed cross, mounted or hung upon the arbor B, so as to revolve with or on the same. The position of the arbor, and the length of the arms of the cross, are such that when two of the arms are in a horizontal position, their upper edges will be about on a level with the bottom of the coupling-chamber in the box A, while the upper vertical arm will reach to about the top of that chamber, as shown on the left-hand side coupling-box in the drawing. D is a dog, pivoted at its rear end to the box, its front end reaching to the rear edge of the lower arm of the cross. E is a spring, by which the end of the dog D is held up, as shown. The upper front corner of the dog D is bevelled, as shown. F is a horizontal lever, pivoted near its middle to the upper part of the coupling-box, being at its front end connected with a bar, $a$, which reaches up through the platform of the car, or through the box of the same. $b$ is a bar suspended from the rear end of the lever F, and reaching down far enough to be in contact with the upper edge of the dog D. G is the link, of suitable or ordinary construction.

When the link is to be inserted, the arms of the cross C are in respective horizontal and vertical positions, as on the left-hand side in the drawing. When the link is pushed in it strikes the upper vertical arm of the cross, and only the dog D offers resistance to the rear horizontal arm of the cross, in the attempt to turn the latter. But as the lower rear corner of the rear horizontal arm of the cross rests upon the bevelled edge of the dog, the pressure of the link will suffice to depress the dog, (see right-hand side coupling-box in drawing,) and thereby the end of the link will bring the formerly upright arm of the cross into a horizontal position, while the former horizontal front arm is now erect in the coupling-box, within the link, as seen on the left-hand side in the drawing. The link will now be locked, as it cannot be drawn out, the front edge of the dog preventing the cross from turning back.

For uncoupling, the bar $a$ must be pulled, thereby the arm $b$ of the lever is depressed, throwing the dog D down, and thus releasing the cross, C. The link can then be easily withdrawn. While the bar $a$ is being raised, the parts are in the position shown on the right-hand side in the drawing. If desired, the parts may be retained in that position by means of a pawl, $c$, which fits into a recess provided on a lug, $d$, which projects from the lever F. In that case the parts will be held so that the cross remains released, thereby preventing the same from coupling a link. The pawl $c$, being connected with a rod, $e$, which projects up through the platform of the car, can be thrown out of the lever F, to lock the cross. The coupling or uncoupling can then be fully controlled from the platform or top of the car. But the pawl $c$ can, if desired, be altogether omitted, as it might be required only in a few special cases.

Having thus described my invention, what I claim as new, and desire to secure by Letters Patent, is—

1. The construction of the revolving four-armed cross, C, pivoted dog D, bent spring E, lever F, and bar $b$, all arranged and operating as described for the purpose specified.

2. The above, in combination with the pawl $e$, fitting into a recess in a lug, $d$, projecting from the lever F, as set forth.

The above specification of my invention signed by me, this 12th day of September, 1867.

E. R. WHITNEY.

Witnesses:
D. S. McMaster,
A. B. Taets.